E. FISHER.
MACHINE FOR SHEARING BOILER-PLATES.

No. 171,655. Patented Jan. 4, 1876.

WITNESSES:
E. Wolff
Alex F. Roberts

INVENTOR:
E. Fisher
BY Munn
ATTORNEYS.

UNITED STATES PATENT OFFICE.

EBENEZER FISHER, OF KINCARDINE, CANADA.

IMPROVEMENT IN MACHINES FOR SHEARING BOILER-PLATES.

Specification forming part of Letters Patent No. 171,655, dated January 4, 1876; application filed October 29, 1875.

*To all whom it may concern:*

Be it known that I, EBENEZER FISHER, of Kincardine, in the Province of Ontario, Dominion of Canada, have invented a new and Improved Boiler-Plate Clipper, of which the following is a specification:

My invention consists of a stationary and a movable shear for clipping boiler-plates, the stationary shear being arranged in a plane so inclined to the movable shear that the edge of the plate being cut is beveled suitably for calking, and at the same time the machine is so inclined that the plate lies flat or horizontally on the stationary cutter, so that it can be operated to better advantage than it could be if the machine stood upright. The cam which works the lever of the movable cutter is contrived to allow the cutter to remain as long as possible when raised, to facilitate the adjusting of the plate.

Figure 1:
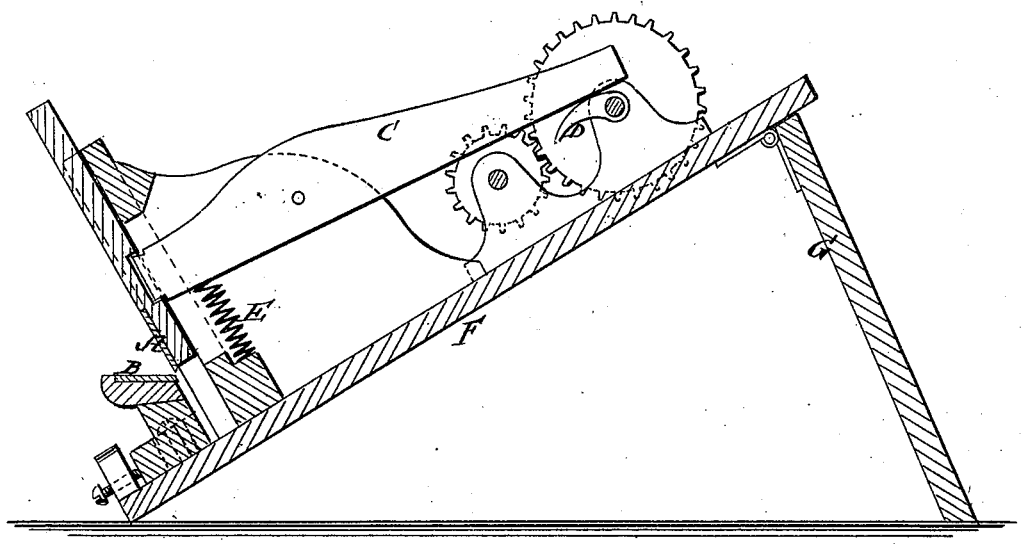
Figure 2:
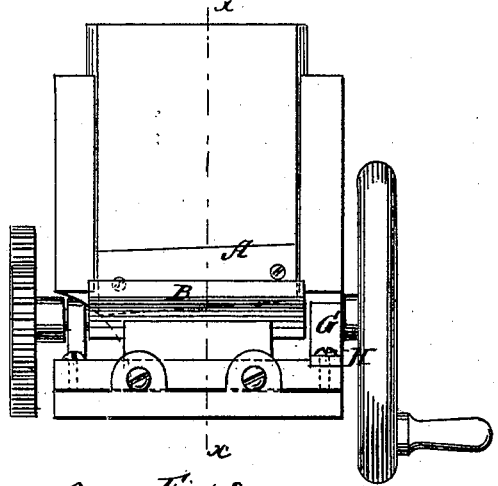
Figure 3:
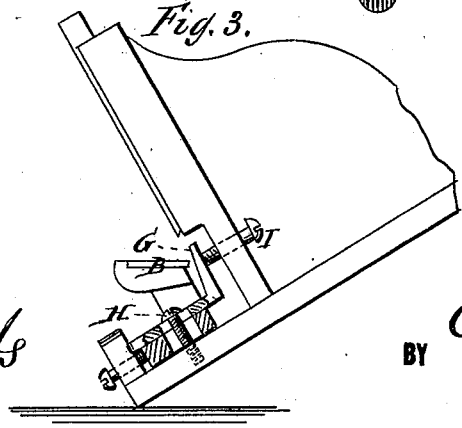

Figure 1 is a sectional elevation of my improved machine. Fig. 2 is a front elevation; and Fig. 3 is a detail, partly in side elevation and partly in section.

A is the movable cutter; B, the stationary one; C, the lever; and D, the cam, and E a spring for operating the movable cutter. Cutter B is inclined, as shown, to the other one, to bevel the edges of the plates suitably for calking, and in order that the plate and cutter B may have a horizontal position the machine is tilted up at the rear end of the bed-plate F by the standard G, which is hinged to the bed-plate in order to fold up to pack the machine away conveniently. The cam is concaved at the back, so as to let the lever fall back to raise cutter A as quick as possible, and remain elevated to afford as much time as can be during each revolution to shift the plates. G is a gage to regulate the position of the plates when presented to the cutters. It is formed with a slot, and shifts along the screw H, which holds it in position, and is itself adjusted by the screw I, which also supports it against the shocks of the plates.

Having thus described my invention, I claim as new and desire to secure by Letters Patent—

The combination of movable cutter A, obliquely arranged stationary cutter B, and bed-plate F, the latter inclined sufficiently to cause the plate being sheared and the stationary cutter to lie horizontally, as shown, and for the purpose specified.

EBENEZER $\overset{\text{his}}{\times}$ FISHER.
mark.

Witnesses:
 GEORGE MILWARD BOYD,
 JNO. JUD FISHER.